United States Patent
Durham et al.

(10) Patent No.: US 11,531,750 B2
(45) Date of Patent: *Dec. 20, 2022

(54) INSTALLING AND MANIPULATING A SECURE VIRTUAL MACHINE IMAGE THROUGH AN UNTRUSTED HYPERVISOR

(71) Applicant: Intel Corporation, Santa Clara, CA (US)

(72) Inventors: David M. Durham, Beaverton, OR (US); Karanvir S. Grewal, Hillsboro, OR (US); Sergej Deutsch, Hillsboro, OR (US); Michael Lemay, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 328 days.

This patent is subject to a terminal disclaimer.

(21) Appl. No.: 16/937,155

(22) Filed: Jul. 23, 2020

(65) Prior Publication Data

US 2021/0011995 A1  Jan. 14, 2021

Related U.S. Application Data

(63) Continuation of application No. 15/721,553, filed on Sep. 29, 2017, now Pat. No. 10,769,272.

(51) Int. Cl.
| | |
|---|---|
| *G06F 9/455* | (2018.01) |
| *G06F 21/53* | (2013.01) |
| *G06F 21/57* | (2013.01) |
| *H04L 9/40* | (2022.01) |

(52) U.S. Cl.
CPC .......... *G06F 21/53* (2013.01); *G06F 9/45554* (2013.01); *G06F 9/45558* (2013.01); *G06F 21/57* (2013.01); *H04L 63/062* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 4,819,455 | A | 4/1989 | Schimko |
| 9,213,653 | B2 | 12/2015 | Durham et al. |
| 9,335,943 | B2 | 5/2016 | Sahita et al. |
| 10,303,899 | B2 | 5/2019 | Durham et al. |
| 2011/0289323 | A1 | 11/2011 | Dejong |
| 2012/0324446 | A1 | 12/2012 | Fries et al. |

(Continued)

FOREIGN PATENT DOCUMENTS

WO  2017112282 A1  6/2017

OTHER PUBLICATIONS

Wikipedia, "Cloud computing", en.wikipedia.org/w/index.php?title=Cloud_computing&oldid=818616594, Dec. 19, 2017, 15 pages.

(Continued)

*Primary Examiner* — Bing Zhao
(74) *Attorney, Agent, or Firm* — Jordan IP Law, LLC

(57) ABSTRACT

Systems, apparatuses and methods may provide for technology that associates a key domain of a plurality of key domains with a customer boot image, receives the customer boot image from the customer, and verifies the integrity of the customer boot image that is to be securely installed at memory locations determined from an untrusted privileged entity (e.g., a virtual machine manager).

20 Claims, 10 Drawing Sheets

(56) References Cited

U.S. PATENT DOCUMENTS

2018/0046823 A1  2/2018  Durham et al.
2018/0247082 A1  8/2018  Durham et al.

OTHER PUBLICATIONS

Non-Final Office Action for U.S. Appl. No. 15/721,553, dated Jun. 21, 2019, 15 pages.
Final Office Action for U.S. Appl. No. 15/721,553, dated Jan. 23, 2020, 17 pages.
Advisory Action for U.S. Appl. No. 15/721,553, dated Apr. 7, 2020, 2 pages.
Notice of Allowance for U.S. Appl. No. 15/721,553, dated May 13, 2020, 12 pages.

INSTALLING AND MANIPULATING A SECURE VIRTUAL MACHINE IMAGE THROUGH AN UNTRUSTED HYPERVISOR

CROSS REFERENCE TO RELATED APPLICATIONS

The present application claims the benefit of priority to U.S. patent application Ser. No. 15/721,553 filed Sep. 29, 2017.

TECHNICAL FIELD

Embodiments generally relate to data security. More particularly, embodiments relate to installing and manipulating a secure virtual machine (VM) image.

BACKGROUND

Conventionally, hosts in virtual cloud environments have been assumed to be trusted computing bases (TCBs). Therefore, protecting guest virtual machines running in a public cloud from attacks via a Virtual Machine Manager (VMM) of a host, has not been of significant concern to customers (also known as "guests") since hosts have generally been trusted by the customers. As attacks on guest virtual machines by VMMs have been contemplated and actually experienced, providing protection to guest virtual machines has become of paramount importance.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
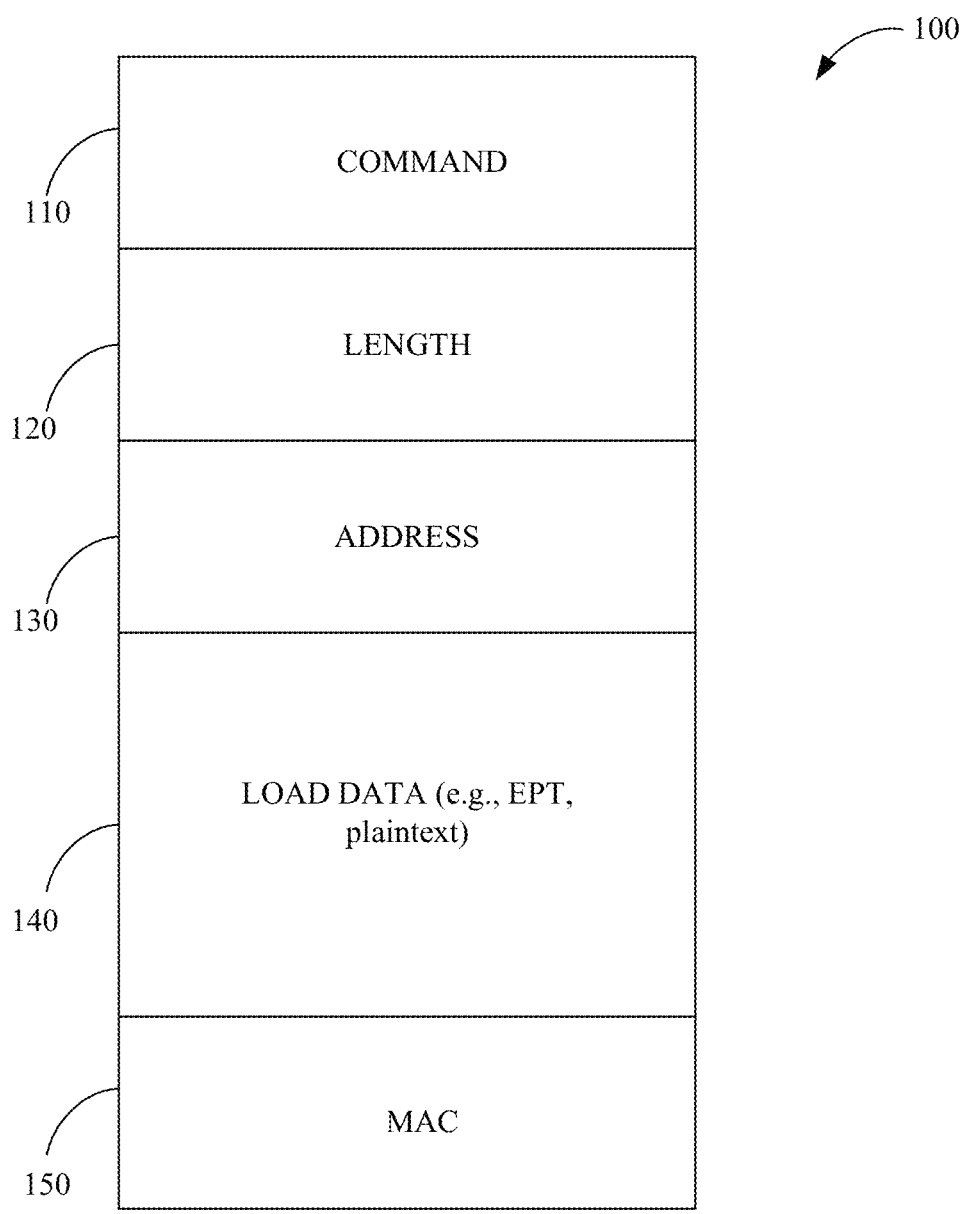
FIG. 1 illustrates an example of a protocol data unit (PDU) that is used in a communication protocol according to an exemplary embodiment.

In the following description, numerous specific details are set forth. It is understood, however, that embodiments may be practiced without these specific details. In other instances, well-known circuits, structures and techniques have not been shown in detail in order to not obscure the understanding of this description.

Providing integrity and replay protection to guest virtual machines running in a public cloud may present challenges. One method of providing replay protection may implement a replay tree in memory that is searched on every memory access. Such an approach, however, may create high memory overhead, limit enclave size and reduce performance. Another method, full memory encryption (and integrity protection), may add integrity protection scaling to all memory with nearly no overhead, but may lack replay protection. Yet another method for guest protection in a cloud environment, may provide cryptographic isolation from a virtual machine (VM) host environment by creating key domains and encrypting each customer's memory with the secret key, where the customer is an entity that uses a cloud service provider as a host. A key domain may include, but is not limited to, a portion of a memory, a server, a physical storage entity, etc. In addition, a special trusted "guest agent" that operates in the VM's key domain may be used to manage the guest's state and memory mappings, in order to protect the VM from tampering via a VMM. The VMM, however, may still attack a guest's VM state by corrupting or replaying memory content, which may not be detected by the guest agent. For example, the VMM may still remap pages within the VM and change the VM's execution flow.

The term "cloud computing" may be used to describe network-based computing (typically over the Internet). Cloud computing may be a model to enable ubiquitous, on-demand access to a shared pool of configurable computing resources (e.g., networks, servers, storage, applications and services), which can be rapidly provisioned and released with minimal management effort. Cloud computing and storage solutions may provide users and enterprises with various capabilities to store and process their data in third-party data centers. Cloud computing may rely on sharing of resources to achieve coherence and economy of scale, similar to a utility (like the electricity grid) over a network.

Cloud computing may provide resources as services. For example, cloud-computing providers may offer their services according to different models, of which the three standard models per the National Institute of Standards and Technology (NIST) are Infrastructure as a Service (IaaS), Platform as a Service (PaaS), and Software as a Service (SaaS). These models may offer increasing abstraction; they are thus often portrayed as layers in a stack, with infrastructure-as-a-stack serving as the bottom layer; platform-as-a-service serving as the middle layer; and software-as-a-service serving as the top layer. These layers may be implemented independently of one another. For example, one might provide SaaS implemented on physical machines (bare metal), without using underlying PaaS or IaaS layers; and conversely one may run a program on IaaS and access it directly, without wrapping it as SaaS.

One enabling technology for cloud computing may be virtualization, which hides the physical characteristics of a computing platform from the users, presenting instead another abstract computing platform, often referred to as a "virtual machine." The software that controls virtualization may be referred to as a "hypervisor" or "virtual machine monitor." The provisioning and execution of a hypervisor/virtual machine monitor to create virtual machines on behalf of the consumer may be an example of a service provided by a public cloud services provider.

Exemplary embodiments may address challenges related to providing security, integrity and replay protection to guest virtual machines in, for example, a cloud-based environment. Exemplary embodiments, however, are not limited to a cloud-based environment. An exemplary embodiment may also add new hardware capabilities to address various issues in the conventional art, including potential physical attacks on physical servers hosting the virtual machines, and enable a protocol between a customer agent and a virtual machine manager (VMM), through which both entities can mutually verify operations on a VM's state and memory mappings—a customer agent may be, for example, hardware and/or software implemented on behalf of a customer to interact with cloud service provider software/hardware, including but not limited to a VMM. The above-mentioned hardware capabilities may be added to existing memory encryption engines, which include, for example, Intel's memory encryption engine (MEE).

Exemplary embodiments may include memory encryption engines that are extended and enhanced with a transaction-based protocol. Examples of a transaction-based protocol, according to one or more exemplary embodiments, may include, for example, installing a new VM boot image in memory prior to a first VM launch, modifying Extended Page Tables (EPTs) which define guest's memory mappings to host's physical memory, and/or modifying Virtual Machine Control Structure (VMCS). Stated differently, exemplary embodiments reflect systems, methods, and apparatuses in which an encrypted image (e.g., VM) may be installed and securely relocated within encrypted memory. "Securely" may mean, for example, that an image cannot be relocated in a way that would compromise its integrity, so it is assured to run/execute correctly, as intended by the originator of the image.

According to an exemplary embodiment, an agent may generate an expected message authentication code (MAC) for each transaction the VMM needs to perform on behalf of the agent. A hardware encryption engine may verify this transaction by generating a MAC and verifying it with the MAC provided by the agent. If the VMM tampers with the transaction data or the destination in memory, the hardware encryption engine may detect a MAC mismatch and prevent performance of the transaction. In addition, the hardware according to an exemplary embodiment may enforce replay protection, for example, by linking the MACs or by using cumulative MACs (GMAC). By moving encryption and security-based operations to hardware, trust may be significantly improved over technology where a programmable general purpose processor or embedded system is responsible for installing memory images, since hardware is fixed function and may be verified by visual inspection, reverse engineering, etc.

One or more exemplary embodiments provide a mechanism to isolate a guest VM from a potentially untrusted VMM with minimal overhead and minimal core architecture impact. Previous solutions using only multi-key full memory encryption do not prevent VMMs from corrupting guest's content or replaying it undetected. Furthermore, using conventional encryption engine technology to secure a guest VM from an untrustworthy VMM might be very costly and not scalable due to large memory and performance overhead. Exemplary results of one or more exemplary embodiments may include, but are not limited to:

a VMM chooses the addresses to which to locate guest images
    Consumers cryptographically define policy
    Protocol implementation on hardware engine ensures:
        No pages can be remapped from consumer's expectation
        No pages can be reused, duplicated, removed, rearranged
        Resulting EPT policy will be correct
        Resulting VMCS will be configured as consumer expects Turning now to FIG. 1, according to an exemplary embodiment, a special protocol may be provided between the software (e.g., Agent, VMM) and the hardware encryption engine to perform integrity-protected and replay-protected transactions. This protocol may enable, for example, the hardware to verify integrity of an initial boot image that is being installed in a key domain and an agent to request the VMM to edit guest VM configuration without the VMM being able to alter the configuration data without an agent's authorization. Transactions via this protocol may be packet-based, resembling a network protocol. The packets may be type-length-value (TLV)-encoded. Referring to FIG. 1, a generic package (or protocol data unit (PDU) 100) may include a data structure consisting of the following components: (1) command 110, (2) length 120, (3) address 130, (4) load data 140, and (5) MAC 150.

The command 110 may determine the type of the transaction (e.g., EPT edit, VMCS edit). The length 120 may determine the length of the package. Address 130 may be a physical memory access, where the load data will be placed. The address 130 may include a key domain ID to specify in what key domain ID the transaction should be performed (e.g., what encryption key the memory encryption (and integrity protection) should use to write the load data into memory). The MAC may be calculated over a subset or over the entire package (excluding the MAC itself), based on the secret key and a transaction number (global per key ID). The authentication algorithm may use AEG-GCM. The secret key may be programmed through a secure channel into a hardware encryption engine and is only known to the customer. The initialization vector may be negotiated between the customer and hardware encryption engine prior to the first transaction. Since the VMM does not have access to the secret key, it cannot forge a valid MAC, as well as it cannot replay a previously seen PDU. Tampering or replay attempts may be detected by the hardware engine and these transactions may be refused. An agent may also query the hardware if a transaction has been completed.

Figure 2:
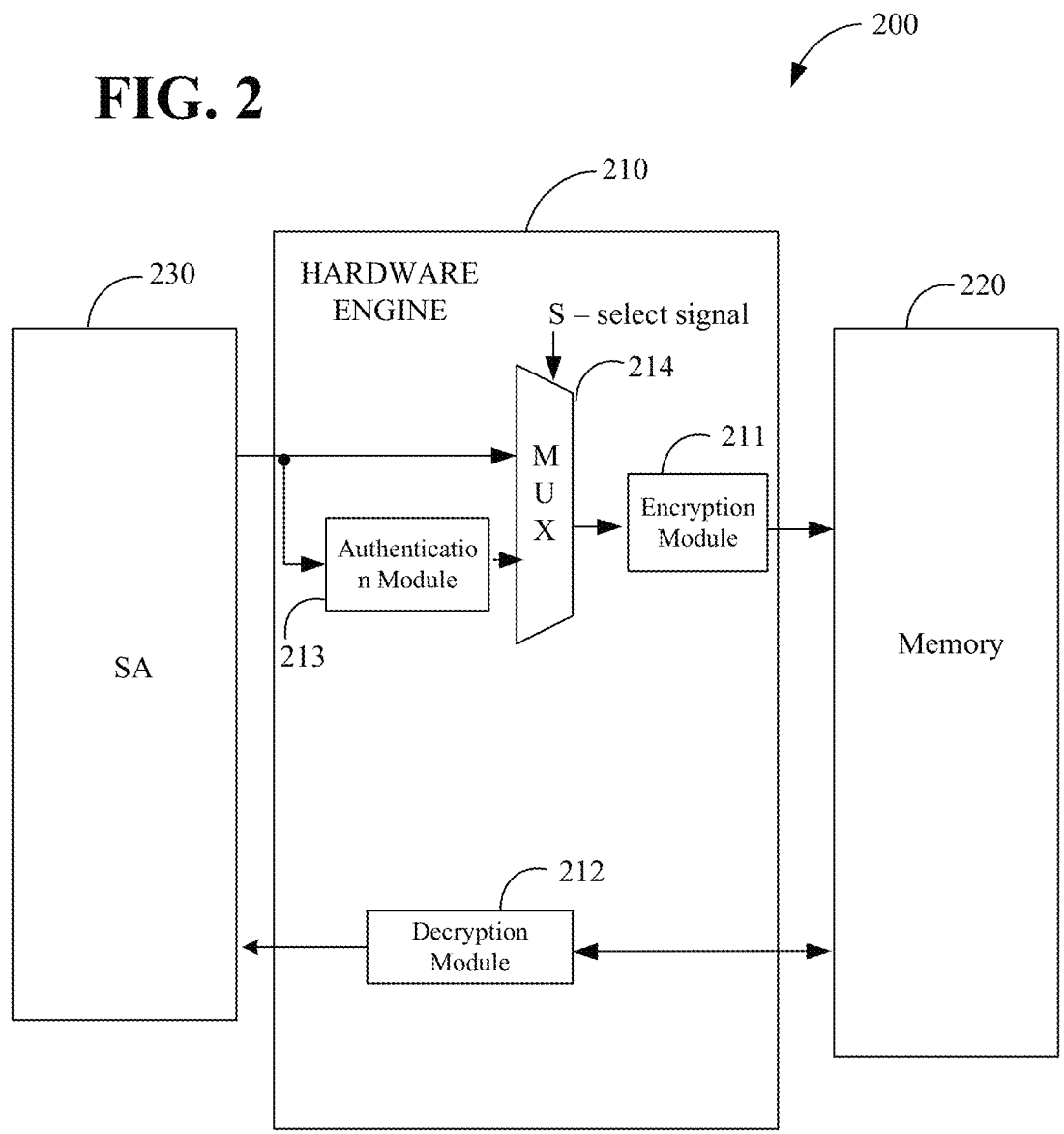
FIG. 2 is an example of architectural view of a system according to an embodiment.

In FIG. 2, an example of an architectural view of a system according to an embodiment is shown. Specifically, FIG. 2 shows a simplified architectural view of a hardware engine 210 and its location with respect to memory 220 (e.g., dynamic RAM/DRAM) and a System Agent (SA) 230. Encryption module 211 and decryption module 212 in FIG. 2 operate in Advanced Encryption System-XEX Tweakable Block Ciphertext Stealing (AES-XTS) mode. An authentication module 213 may be an AES-GCM authentication engine that generates and verifies the MAC. Exemplary embodiments are not limited to AES-GCM, which may be substituted with other authentication algorithms. In FIG. 2, a select signal is received at a multiplexer 214, which selects between regular data (coming unencrypted from an SA) and PDUs (e.g., GCM encrypted) based on the select signal. Different memory ranges may be selected for regular data and PDUs, thus a memory range check may determine the type.

In one or more exemplary embodiments, the hardware reflected in FIG. 2 may be on the same die or chip as the processor and cache (not shown). By being on the same chip or die, the exemplary embodiment may protect data that is, for example, being transmitted from the chip or die, when data may be exposed to an attacker. Thus, the data that is leaving the chip or die may be encrypted based on a solution provided in one or more exemplary embodiments.

Figure 3:
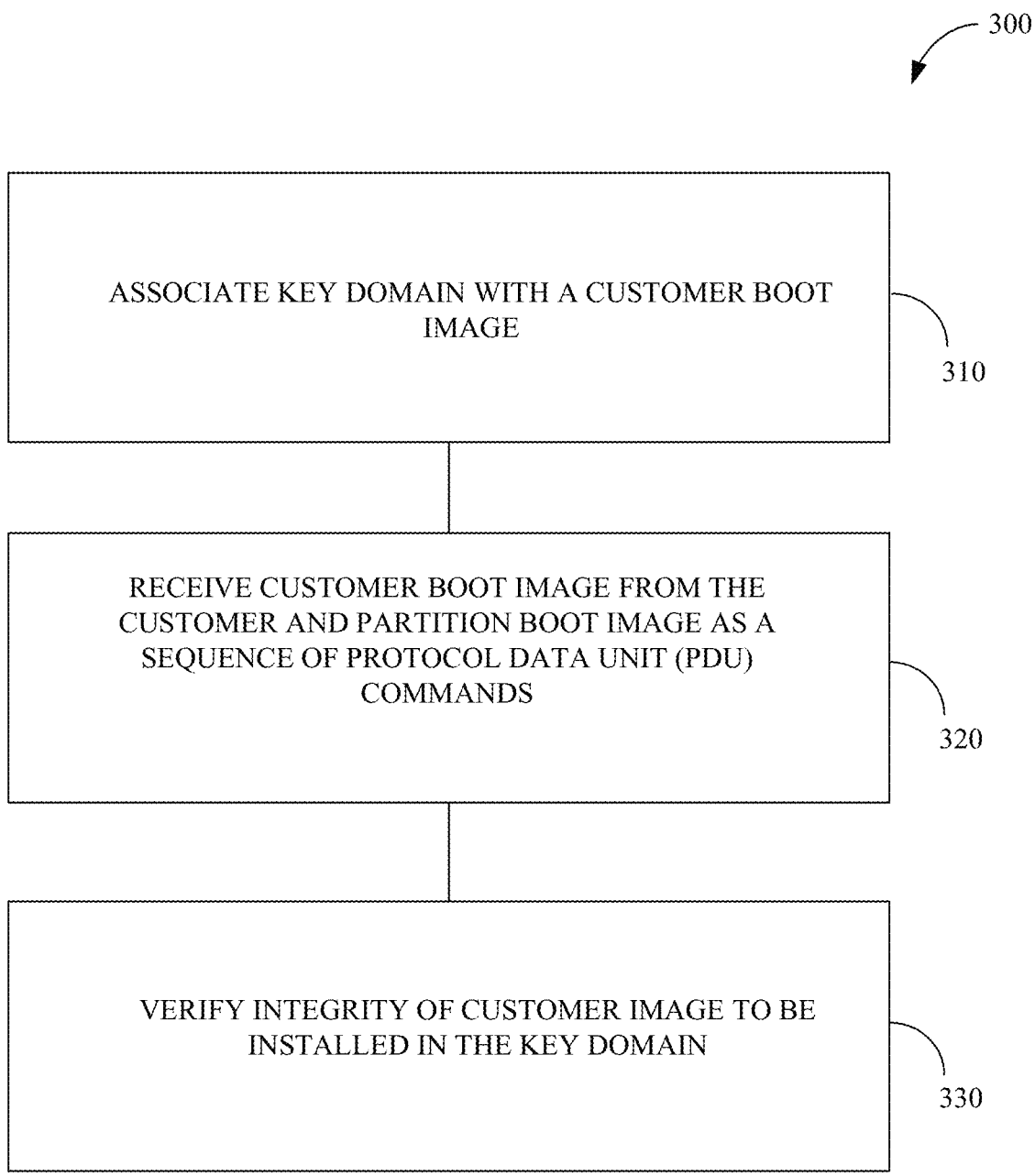
FIGS. 3 and 4 are flowcharts of examples of methods of installing a customer image according to an exemplary embodiment.
Figure 4:
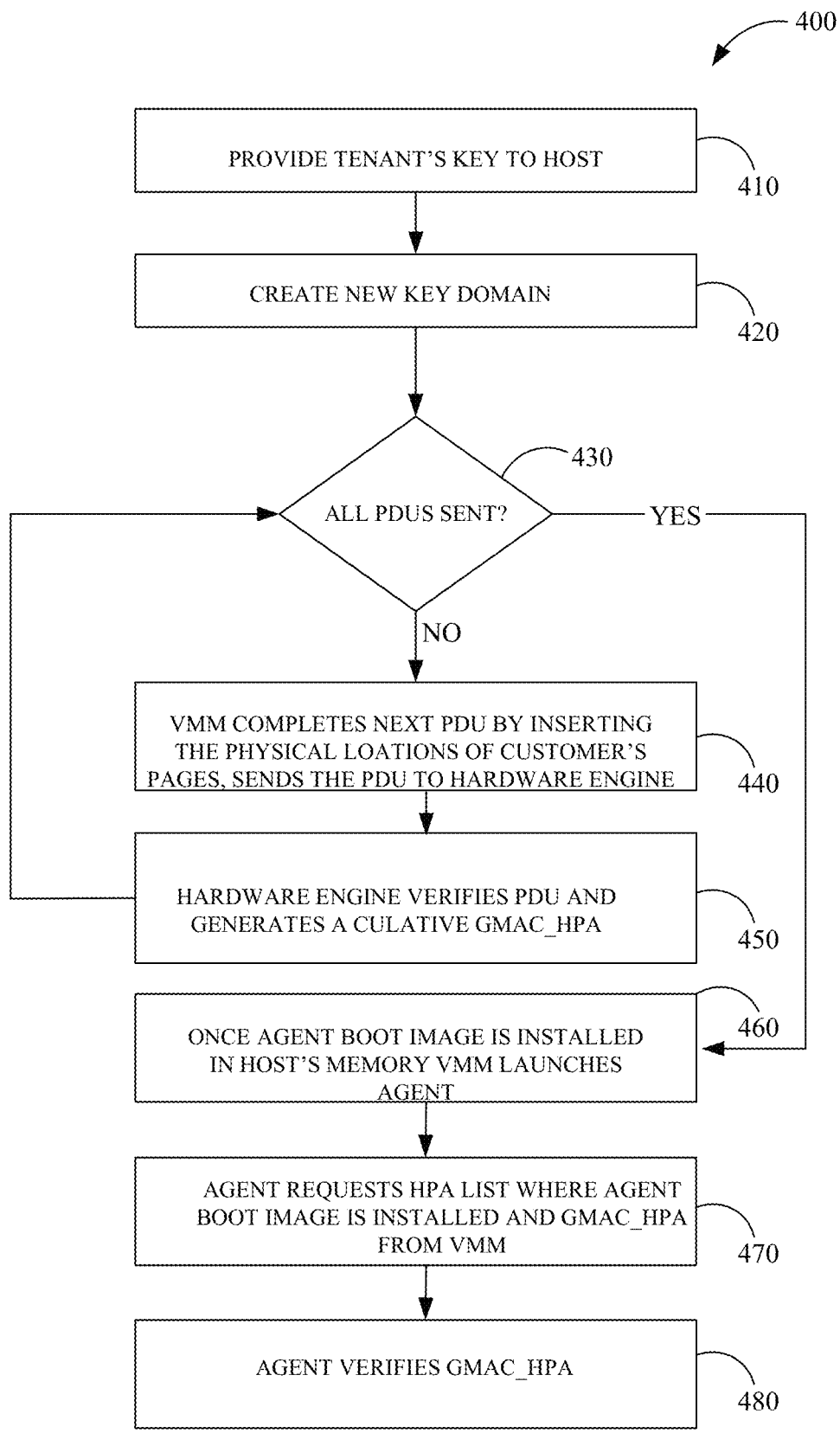

FIGS. 3 and 4 describe methods 300 and 400, respectfully, of installing a customer image (e.g., during an initialization phase of an agent image according to the system of FIG. 2). The methods 300, 400 may generally be implemented in a computing system such as, for example, a cloud-based network computing system. More particularly, the methods 300, 400 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the methods 300, 400 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The description below traverses the blocks set forth in both embodiments of FIGS. 3 and 4. First, according to an exemplary embodiment of FIG. 3, processing block 310 associates a key domain among a plurality of key domains with a customer image. At block 320, a customer may transfer an image to the host, where the image is partitioned as a sequence of PDU commands. Finally, at block 330, the integrity of the customer image that is to be installed in the key domain is verified.

According to the embodiment of FIG. 4, at block 410, the hardware may be programmed with a customer's key that is securely transferred to the host over the network, e.g., using public key technology. At block 420, the hardware may then create a new key domain for the guest.

The PDUs may be encrypted by the customer of a cloud service provider in some instances, and not by the VMM. However, parts of the PDU may be edited by the VMM in one or more exemplary embodiments, while other parts of the PDU are inaccessible to the VMM. The PDU parts that are inaccessible to the VMM may be authenticated using an authenticity code, such as, for example, GMAC.

According to the exemplary embodiment of FIG. 4, a cloud provider's VMM may complete the PDUs by inserting the physical location of a customer's pages at block 440. The VMM may send the PDUs to the hardware engine 210, which may verify the integrity, blocks 440 and 450, and the order of PDUs. A hardware engine 210 also may generate a cumulative MAC (GMAC_HPA) over the host physical addresses (HPAs), in which the image has been written at block 450. Once the agent boot image is installed in the host's memory, at block 460, the VMM may launch the agent. At block 470, an agent may request a list of HPAs where it has been installed, as well as GMAC_HPA. At block 480, the agent may verify GMAC_HPA using the secret key, and, at block 480, may continue to run only if that verification is successful.

While a customer may construct an in-memory agent boot image that is already encrypted using the destination physical memory addresses allocated by the cloud service provider, the instant case provides a mechanism in which the agent boot image may be safely constructed without knowing the physical memory addresses in advance.

Also, during initialization of an agent's boot image, the hardware engine 210 may verify that the pages are installed into the memory in-order and in non-overlapping physical page frames. Consider the following example of a page table with 3-level paging and a page size of three entries, as shown in FIG. 5.

Figure 5:
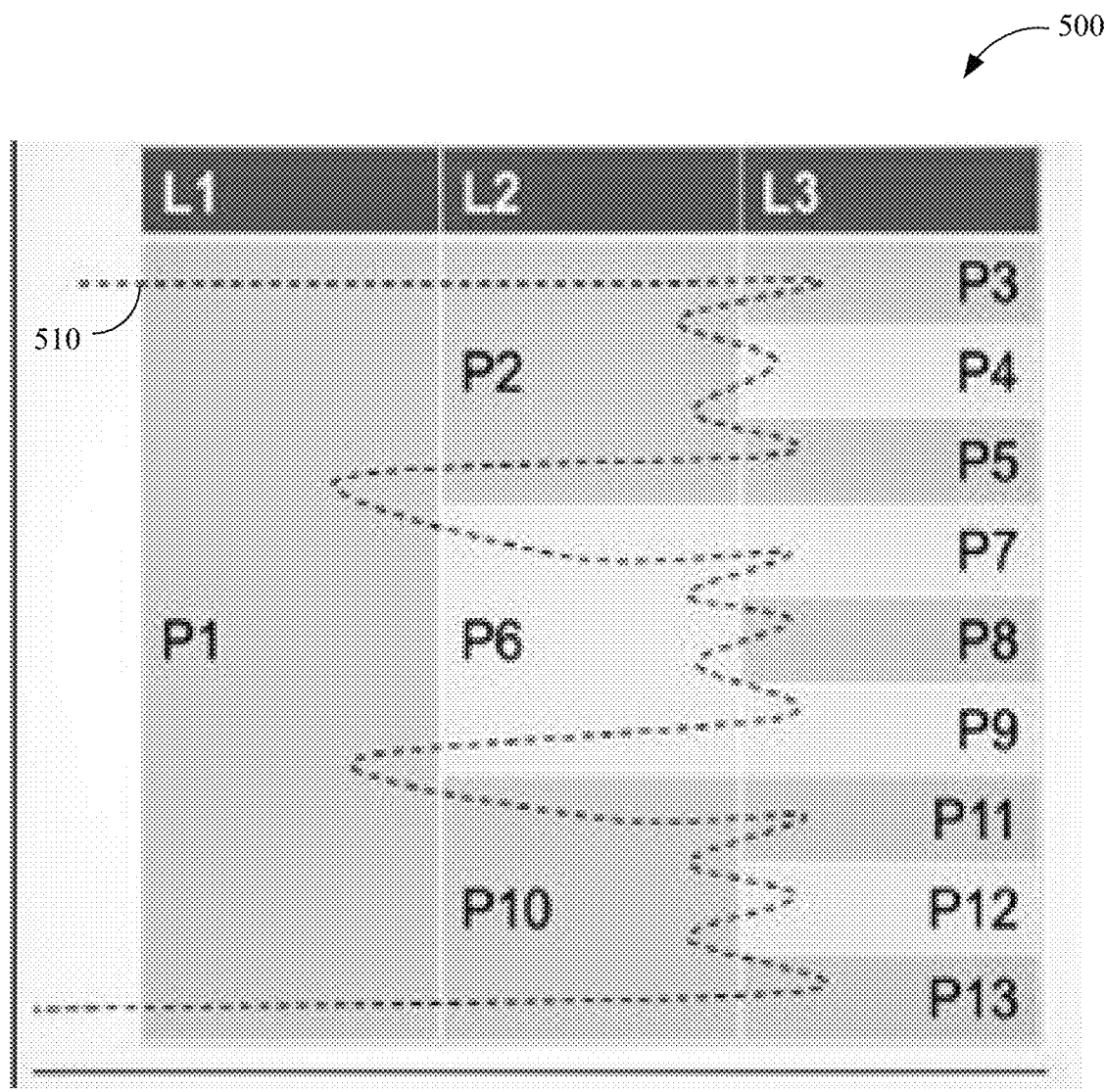
FIG. 5 is an illustration of an example of a page table according to an exemplary embodiment.

Turning to FIG. 5, the page table 500 may be viewed as a tree having a root page at level L1 and 3 leaf pages containing PDUs (P3, P4, P5), PDUs (P7, P8, P9), and PDUs (P11, P12, P13). A VMM may be the resource manager for a platform (e.g., a cloud service provider platform). The VMM may decide which physical pages of memory are assigned to a respective VM's page table. In FIG. 5, the page table 500 may reflect the physical addresses that correspond to the guest VM physical addresses. For example, a VMM using hardware of a cloud service provider, may install PDUs into the pages in-order from the top-level page down to the leaf pages, and return to the previous level when reaching the end of the pages at a given level. In this examples, pages would be installed in the order: P->P2->P3-> . . . ->P13. The line 510 in FIG. 5 shows the sequence of PDUs that may be installed in the page table 500. The hardware engine may verify the incrementing addresses by keeping a global counter for a key domain, as well as counters for each of the levels L1, L2, and L3. The global counter and the counters for each of the levels may be used to verify that the PDUs making up the agent boot image were properly and securely installed into the page table 500. A hardware engine 210 may verify such secure installation based on a sequential/incremental loading of the page table 500.

An error condition with respect to the installation may occur if, for example, P11 is referred to after P13, as the pages are loaded incrementally and a reference from P13 to P11 would not be consistent with such incremental loading.

In an exemplary embodiment, a hardware engine, such as hardware engine 210 of FIG. 2, may decrypt GCM-encrypted portions of a PDU and authenticate them. Based on the command encoded in the PDU and the load, the hardware engine 210 may perform direct writes to memory 220 using an appropriate key. The hardware engine 210 may generate a cumulative signature of the VM boot image installed in the memory 220 so the customer can query it to verify its integrity. The signatures may run over the counters to ensure replay protection.

Figure 6:
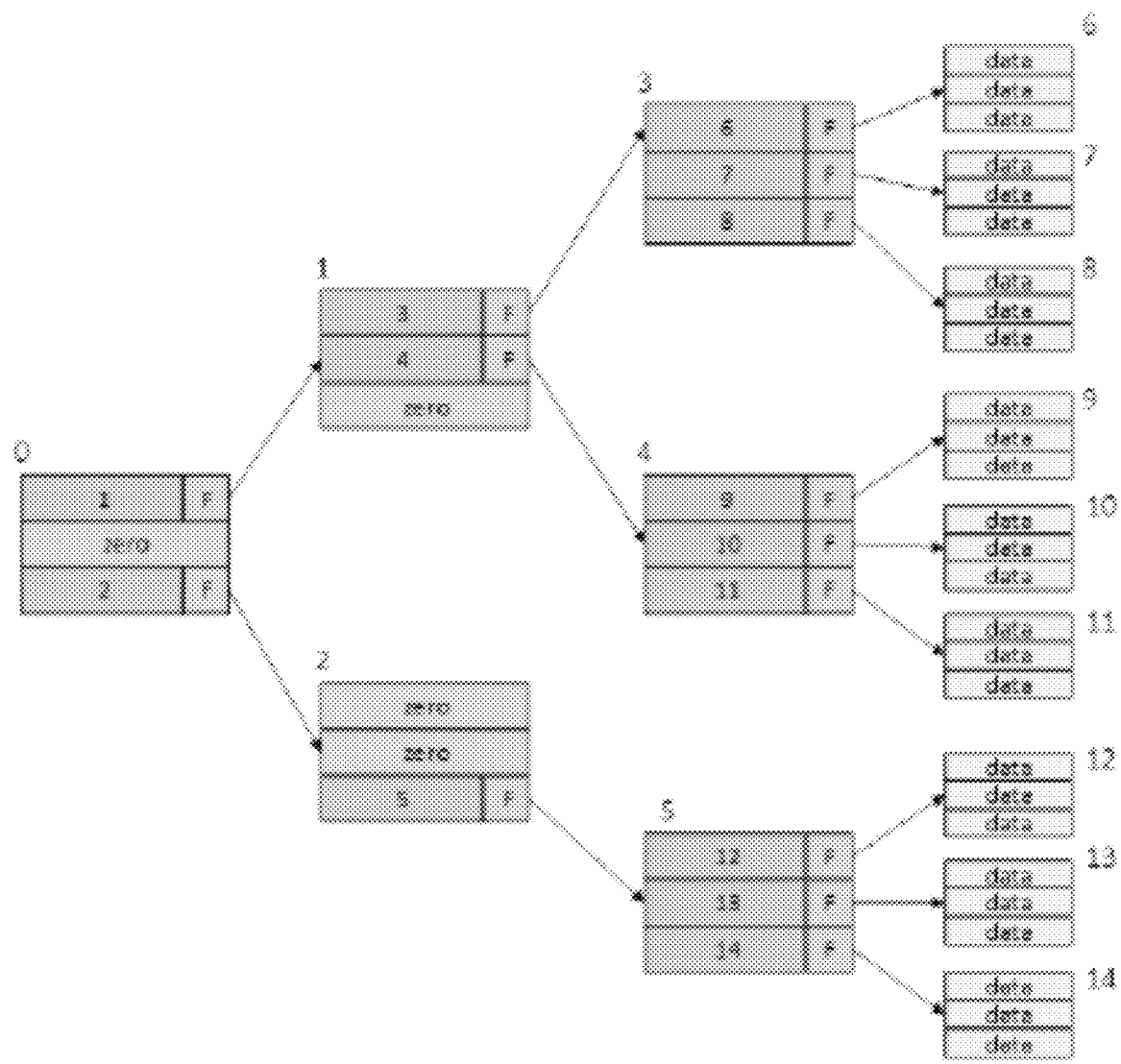
FIG. 6 is an illustration of an example of a tree architecture according to an embodiment.

As an alternative to the depth first method of secure tree serialization illustrated in FIG. 5, other methods of secure tree serialization may be implemented. For example, a breadth first method of secure tree serialization may be implemented. In a breadth first approach, first, an EPT root directory may be installed. Then, second level tables are installed in the order corresponding to the order of their pointers in the directory, then third level tables, and so on. An example is shown in FIG. 6, where the numbered fields are pointers, the "F" fields are flags, "zero" represent non-present entries, and some pages are data/code pages. The numbers near the top corners are labels for host physical addresses. The pages are installed in the order 0->1->2 . . . ->14.

When installing the PDUs into pages of the page tables, the full memory encryption engine may perform the following checks:

Dynamically calculate a cumulative keyed MAC over the static content (everything but the numbered fields (e.g., the fields with numbers in them in FIG. 6)—they are not known a priori) and compare the cumulative keyed MAC to a golden MAC of all static content. The golden MAC of all static content may be calculated by the client and given to the host with an agent boot image. Once the image is installed (a special PDU may indicate that the image is installed), full memory encryption may compare MACs and clear the key if there was a mismatch.

Cumulative keyed MACs over these two sequences and compare them:
1. Physical addresses where PDUs have been installed into the pages (i.e., follow the numbers in the top corners)
2. EPTP (0) followed by all the pointers in present entries in the order of installation (i.e., start with EPTP)

With continuing reference to FIGS. 5 and 6, both sequences may be equal according to an exemplary embodiment. Full memory encryption (and integrity), according to an exemplary embodiment, checks the quality after image installation and clears the key if the MACs mismatch. In addition, the VMM (or the agent directly) may query the second (dynamic) MAC and give the second (dynamic) MAC to the agent together with the sequence of the physical pages where PDUs of the agent are installed. The agent then knows where the PDUs are installed and can verify the MAC.

In FIG. 6, note that the labels are in no particular order (e.g., the address labeled "4" may be higher than the one labeled "5"). An exemplary result of the breadth-first method described above may be that the pages can be written cache-line by cache-line as opposed to one EPT entry at a time in a "descending" order.

Figure 7:
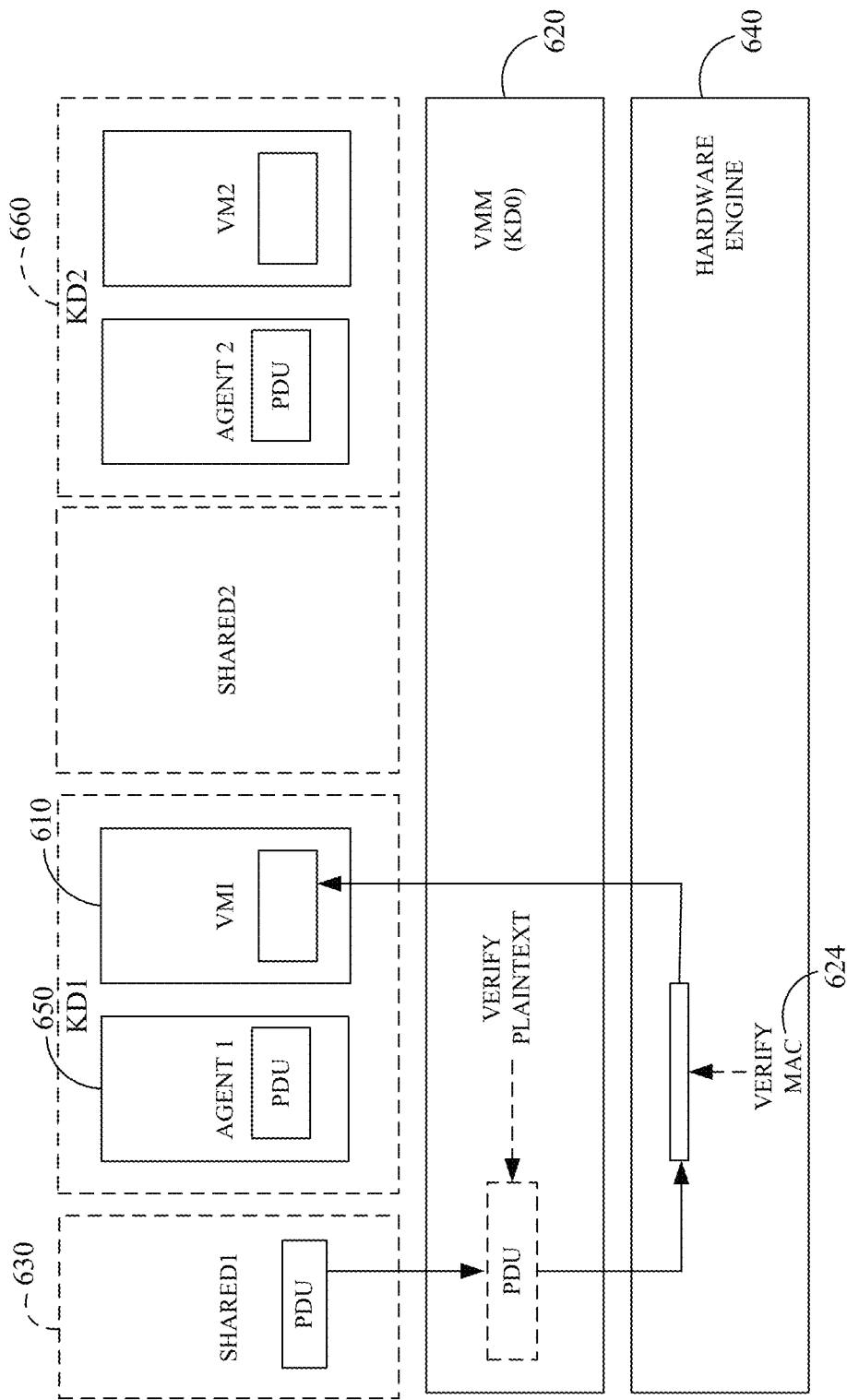
FIG. 7 is an illustration of an example of an architecture to edit extended page tables of virtual machines through a VMM on behalf of an agent according to an embodiment.

Turning now to FIG. 7, which, according to an exemplary embodiment, illustrates an architecture for editing VM's EPTs through the VMM on behalf of an agent. In the exemplary embodiment, each VM and its Agent may run in separate key domain 610 (KD1, KD2, . . . KDN), each of which is different from the VMM's key domain 620 (KD0). There may be shared space per key domain that is accessible both to the corresponding agent and the VMM. In this exemplary embodiment, the VMM may perform up-calls to each agent, for instance, to request EPT edits.

According to an exemplary embodiment, an agent1 650 may create a PDU in, for example, the format described in FIG. 1. The PDU may contain updated EPT entries (one or more) and the address(es) where the entries reside in a host physical memory. The agent may generate a MAC over the address and the EPT entries (e.g., GMAC) using a secret key of KD1 and a global transaction counter. Both the agent and the hardware engine 640 may keep track of the global transaction count (per key domain), which is incremented with every PDU. The agent may copy the entire PDU to a shared space (Shared1) 630, from which the VMM can inspect the PDU and verify the plaintext content of the PDU, i.e., the address and the EPT edits. The VMM then sends 622 the PDU to the hardware engine 640, where the hardware engine 640 can verify the GMAC 624, as it has the secret key and the transaction count. If the agent's GMAC matches the hardware engine's GMAC, the hardware engine 640 may update the EPT entries at the specified address 626 in KD1.

An exemplary result of the processes set forth above may be that an agent cannot request EPT edits that are not authorized by the VMM, and the VMM can verify the plaintext in PDU while denying unauthorized operations. Furthermore, the VMM may be unable able to modify the PDU without detection, as the VMM does not have the secret key to generate a valid MAC. Any modifications of the PDU may be detected by the hardware engine 640 with high probability depending on MAC strength. Upon such violations, the hardware engine 640 may refuse to modify memory content and report an integrity violation error.

As evident by the above example, the hardware may protect against PDU replay, for example, by linking MACs, by using a total transaction MAC, or by using a GMAC to ensure the entire transaction is present and uncorrupted.

After a leaf page is completely filled with consecutive PDUs (as shown in FIG. 5), a hardware engine 640 may automatically move back to the previous page level and then a page-table populating session may terminate. Alternatively, a single-level mechanism that just fills consecutive data pages may be useful if an identity-mapped paging mode is in use. For example, an identity-mapped paging mode may be realized by the processor responding to Translation Lookaside Buffer (TLB) misses by first checking one or more range registers that define the beginning and ending addresses of the agent memory regions and then inserting identity mappings in the TLB for the requested pages if the range register checks indicate that the requested memory access should be permitted. The range registers may also specify permissions, page mapping sizes, and other attributes associated with each memory range. The agent may be implemented using position-independent code so that it functions correctly regardless of its starting guest linear address if its pages retain their correct ordering and are contiguous. An identity-mapped paging mode may also be useful for other types of guests to improve their performance.

Also, a back channel from hardware engine to customer agent may be provided. By providing a back channel, a hardware engine such as hardware engine 640 of FIG. 6 may communicate back to a customer's guest agent, where the customer's PDU content was installed in memory. The agent may then remember the memory mappings to make updates to itself or other customer VMs or control structures, thereby ensuring that the VMM is not compromising security by selecting overlapping or conflicting address for new memory allocations.

Figure 8:
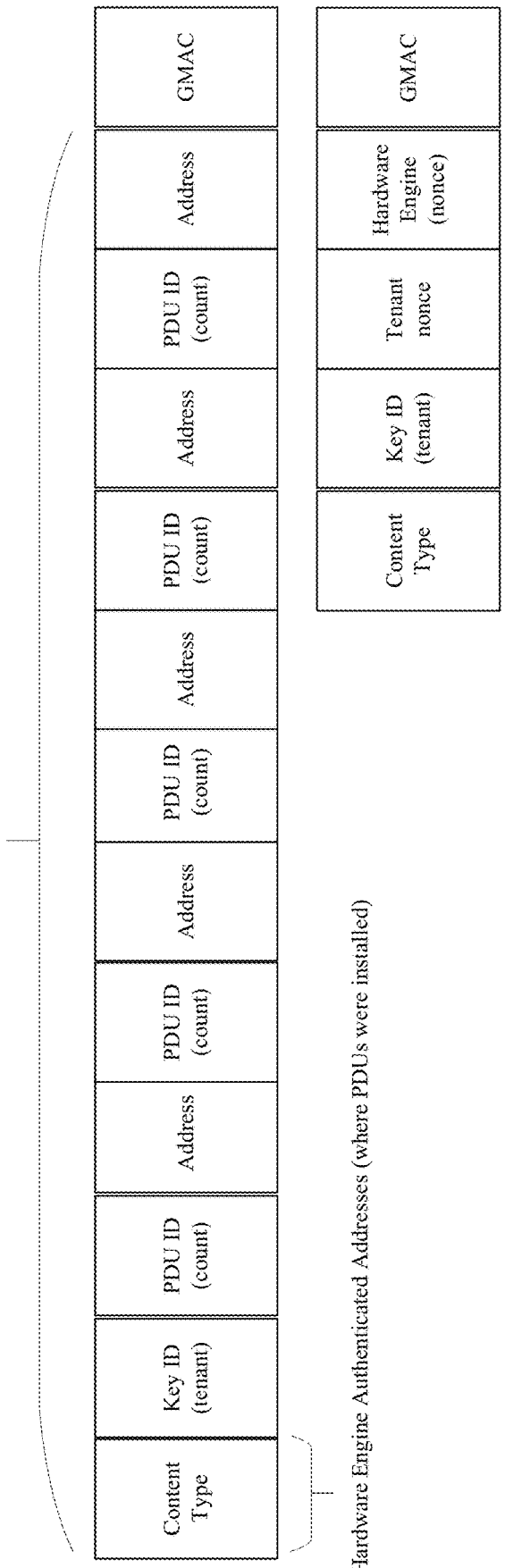
FIG. 8 illustrates an example of a backchannel PDU format according to an embodiment.

FIG. 8 illustrates an exemplary backchannel PDU format which may be used to effectuate the backchannel communication discussed above. According to an embodiment, the guest agent may provide a monotonically increasing nonce value to a hardware engine 640 (through the VMM) which is authenticated/GMACed with the guest's key. The hardware may then respond to this nonce request by providing its own monotonic counter value for the guest's session, which again may be authenticated/GMACed using the customer's key including the guest-provided nonce.

One or more of the methods disclosed above may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the methods 300 and/or 400 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 9:
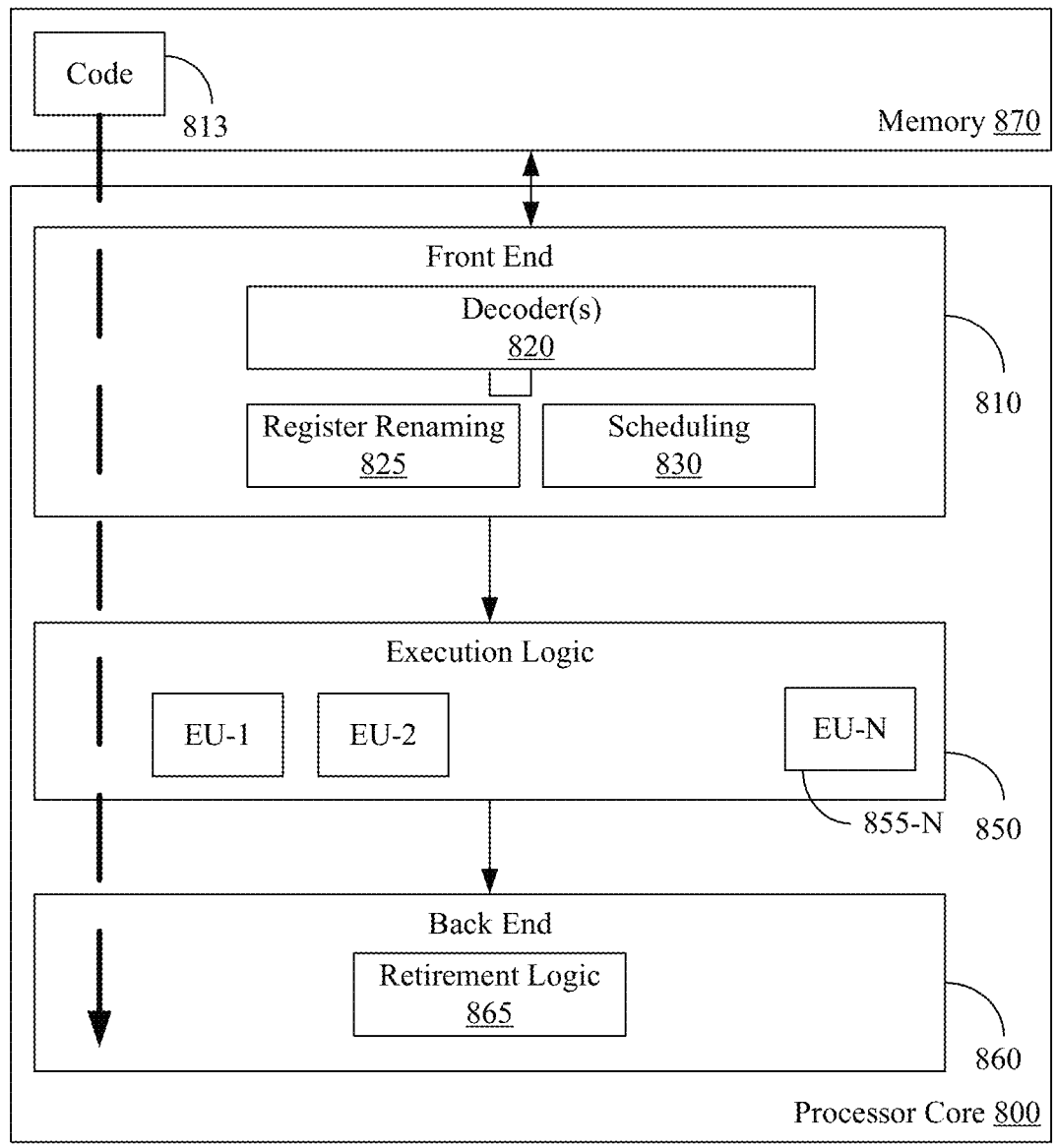
FIG. 9 is a block diagram of an example of a processor according to an embodiment.

FIG. 9 illustrates a processor core 800 according to one embodiment. The processor core 800 may be the core for any type of processor, such as a micro-processor, an embedded processor, a digital signal processor (DSP), a network processor, or other device to execute code. Although only one processor core 800 is illustrated in FIG. 9, a processing element may alternatively include more than one of the processor core 800 illustrated in FIG. 9. The processor core 800 may be a single-threaded core or, for at least one embodiment, the processor core 800 may be multithreaded in that it may include more than one hardware thread context (or "logical processor") per core.

FIG. 9 also illustrates a memory 870 coupled to the processor core 800. The memory 870 may be any of a wide variety of memories (including various layers of memory hierarchy) as are known or otherwise available to those of skill in the art. The memory 870 may include one or more code 813 instruction(s) to be executed by the processor core 800, wherein the code 813 may implement the method 300 (FIG. 3) and/or the method 400 (FIG. 4), already discussed. The processor core 800 follows a program sequence of instructions indicated by the code 813. Each instruction may enter a front-end portion 810 and be processed by one or more decoders 820. The decoder 820 may generate as its output a micro operation such as a fixed width micro operation in a predefined format, or may generate other instructions, microinstructions, or control signals which reflect the original code instruction. The illustrated front end portion 810 also includes register renaming logic 825 and scheduling logic 830, which generally allocate resources and queue the operation corresponding to the convert instruction for execution.

The illustrated processor core 800 may include execution logic 850 having a set of execution units 855-1 through 855-N. Some embodiments may include a number of execution units dedicated to specific functions or sets of functions. Other embodiments may include only one execution unit or one execution unit that can perform a particular function. The illustrated execution logic 850 performs the operations specified by code instructions.

After completion of execution of the operations specified by the code instructions, back end logic 860 retires the instructions of the code 813. In one embodiment, the processor core 800 allows out of order execution but requires in order retirement of instructions. Retirement logic 865 may take a variety of forms as known to those of skill in the art (e.g., re-order buffers or the like). In this manner, the processor core 800 is transformed during execution of the code 813, at least in terms of the output generated by the decoder, the hardware registers and tables utilized by the register renaming logic 825, and any registers (not shown) modified by the execution logic 850.

Although not illustrated in FIG. 9, a processing element may include other elements on chip with the processor core 800. For example, a processing element may include memory control logic along with the processor core 800. The processing element may include I/O control logic and/or may include I/O control logic integrated with memory control logic. The processing element may also include one or more caches.

Figure 10:
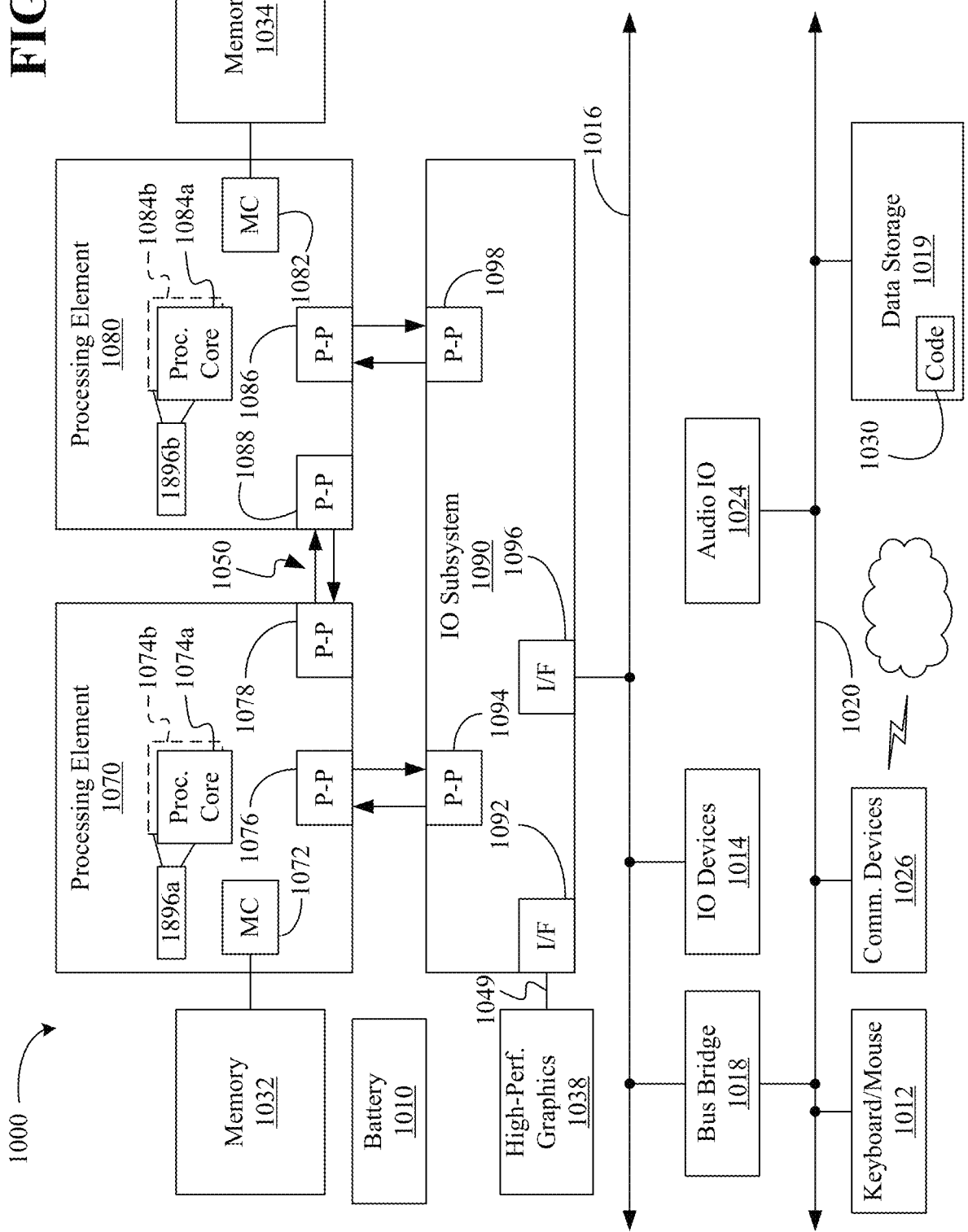
FIG. 10 is a block diagram of an example of a computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high-performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 300 (FIG. 3) and/or the method 400 (FIG. 4), already discussed, and may be similar to the code 813 (FIG. 9), already discussed. Further, an audio I/O 1024 may be coupled to second bus 1020 and a battery 1010 may supply power to the computing system 1000.

Note that other embodiments are contemplated. For example, instead of the point-to-point architecture of FIG. 7, a system may implement a multi-drop bus or another such communication topology. Also, the elements of FIG. 10 may alternatively be partitioned using more or fewer integrated chips than shown in FIG. 10.

Additional Notes and Examples

Example 1 may include a system to load a customer boot image into memory, the system comprising a system agent, the memory, and a semiconductor hardware device provided between the system agent and the memory, wherein the semiconductor hardware device comprises a substrate and logic coupled to the substrate. The logic may be implemented at least partly in one or more of configurable logic or fixed-functionality hardware logic, wherein the logic is coupled to the substrate to associate a key domain of a plurality of key domains with a customer boot image, receive the customer boot image from the customer, wherein receiving the customer boot image comprises partitioning the customer boot image as a sequence of protocol data units (PDUs) and loading each PDU of the sequence of PDUs consecutively into a sequential page of the memory, and verify integrity of the customer boot image that is to be installed in the key domain.

Example 2 may include the system of Example 1, wherein the integrity of the customer boot image is to be verified based on whether the pages of the memory have been sequentially populated.

Example 3 may include the system of Example 2, wherein the page table is to include one or more mappings of virtual addresses to physical addresses of the memory.

Example 4 may include the system of Example 3, wherein the semiconductor hardware device is to generate a hash function related to the physical addresses.

Example 5 may include the system of any one of Examples 1 to 4, wherein the system is to be provided in a cloud-based server.

Example 6 may include the system of any one of Examples 1 to 5, wherein the key domain is to be associated with the customer boot image based on a customer key received from a customer.

Example 7 may include the system of any one of Examples 1 to 6, wherein, to associate the key domain with the customer boot image, the logic coupled to the substrate is to create a new key domain to store the customer boot image.

Example 8 may include the system of any one of Examples 1 to 6, wherein, to associate the key domain with the customer boot image, the logic coupled to the substrate is to select the key domain among the plurality of key domains to store the customer boot image.

Example 9 may include the system of Example 3, wherein after a leaf page is completely filled with consecutive PDUs, the semiconductor hardware device moves to a previous PDU level.

Example 10 may include the system of Example 9, wherein the semiconductor hardware device is to implement an identity-mapped page mode.

Example 11 may include a semiconductor package apparatus to load a customer boot image, the semiconductor package apparatus comprising a substrate and logic coupled to the substrate, wherein the logic may be implemented at least partly in one or more of configurable logic or fixed-functionality hardware logic, and may be coupled to the substrate to associate a key domain of a plurality of key domains with the customer boot image, receive the customer boot image from a customer, wherein receiving the customer boot image comprises partitioning the customer boot image as a sequence of protocol data units (PDUs) and loading each PDU of the sequence of PDUs consecutively into a sequential page of the memory, and verify an integrity of the customer boot image that is to be installed in the key domain.

Example 12 may include the semiconductor package apparatus of Example 11, wherein the integrity of the customer boot image is to be verified based on whether the pages of the memory have been sequentially populated.

Example 13 may include the semiconductor package apparatus of Example 12, wherein the page table is to include one or more mappings of virtual addresses to physical addresses of the memory.

Example 14 may include the semiconductor package apparatus of Example 13, wherein a hash function related to the physical addresses is to be generated.

Example 15 may include the semiconductor package apparatus of any one of Examples 11 to 14, wherein the semiconductor package apparatus is to be provided in a cloud-based server.

Example 16 may include the semiconductor package apparatus of any one of Examples 11 to 15, wherein the key domain is to be associated with the customer boot image based on a customer key received from a customer.

Example 17 may include the semiconductor package apparatus of any one of Examples 11 to 16, wherein, to associate the key domain with the customer boot image, the logic coupled to the substrate is to create a new key domain to store the customer boot image.

Example 18 may include the semiconductor package apparatus of any one of Examples 11 to 16, wherein, to associate the key domain with the customer boot image, the logic coupled to the substrate is to select the key domain among the plurality of key domains to store the customer boot image.

Example 19 may include the semiconductor package apparatus of Example 13, wherein after a leaf page is completely filled with consecutive protocol data units (PDUs), the semiconductor package apparatus moves to a previous PDU level.

Example 20 may include the semiconductor package apparatus of Example 19, wherein an identity-mapped page mode is to be implemented.

Example 21 may include a method of loading a customer boot image, the method comprising associating a key domain of a plurality of key domains with a customer boot image, receiving the customer boot image from a customer, the receiving the customer boot image comprising partitioning the customer boot image as a sequence of protocol data units (PDUs) and loading each PDU of the sequence of PDUs consecutively into a sequential page of a memory, and verifying an integrity of the customer image that is to be installed in the key domain.

Example 22 may include the method of Example 21, wherein the integrity of the customer boot image is to be verified based on whether the pages of the memory have been sequentially populated.

Example 23 may include the method of Example 22, wherein the page table is to include one or more mappings of virtual addresses to physical addresses.

Example 24 may include the method of Example 23, wherein the method further includes generating a hash function related to the physical addresses of the memory.

Example 25 may include the method of Example 23, wherein the method further includes moving to a previous PDU level after a leaf page is completely filled with consecutive protocol data units (PDUs).

Example 26 may include the method of Example 25, wherein the method further includes implementing an identity-mapped page mode.

Example 27 may include a semiconductor package apparatus for loading a customer boot image. The semiconductor package apparatus may include means for associating a key domain among a plurality of key domains with the customer boot image, means for receiving the customer boot image from a customer, and means for verifying an integrity of the customer image that is to be installed in the key domain.

Example 28 may include the semiconductor package apparatus of Example 27, wherein the page table is to include one or more mappings of virtual addresses to physical addresses.

Example 29 may include the semiconductor package apparatus of Example 28, wherein the semiconductor package apparatus further comprises means for generating a hash function related to the physical addresses.

One or more exemplary embodiments may be applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines may be represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of one or more embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the one or more embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a system manager that manages actions for an associated guest virtual machine that is to be provisioned; and
a semiconductor hardware device provided between the system manager and memory of
the system, the semiconductor hardware device comprising:
a substrate; and
logic coupled to the substrate, wherein the logic is implemented at least partly in one or more of configurable logic or fixed-functionality hardware logic, the logic coupled to the substrate working in conjunction with the system manager to:
associate, using a key for a customer, a key domain of a plurality of key domains with a virtual machine image associated with the guest virtual machine, the key being unknown to a virtual machine manager associated with the guest virtual machine;
receive the virtual machine image from the customer;
partition, by at least the system manager, the virtual machine image as a sequence of protocol data units (PDUs);
load content of each PDU of the sequence of PDUs consecutively into a sequential page of the memory, wherein each page is loaded into a page table of the guest virtual machine and the logic keeps track of loading using a global transaction count for the key domain and a location in memory of the page; and
verify an integrity of the virtual machine image that is to be installed in the key domain by checking, using the key, a value calculated using the page location, content, and the global transaction count of each of the loaded PDUs.

2. The system according to claim 1, wherein the page table is to include one or more mappings of virtual addresses to physical addresses of the memory.

3. The system according to claim 1, wherein the system is to be provided in a cloud-based server.

4. The system according to claim 1, wherein the key domain is to be associated with the virtual machine image based on the customer key received from the customer.

5. The system according to claim 1, wherein, to associate the key domain with the virtual machine image, the logic coupled to the substrate is to create a new key domain to store the virtual machine image.

6. The system according to claim 1, wherein, to associate the key domain with the virtual machine image, the logic coupled to the substrate is to select the key domain among the plurality of key domains to store the virtual machine image.

7. The system according to claim 1, wherein after a leaf page of the page table is completely filled with consecutive PDUs, the semiconductor hardware device moves to a previous PDU level.

8. A semiconductor package apparatus of a system including a system manager that manages actions of an associated guest virtual machine that is to be provisioned, the semiconductor package apparatus comprising:
a substrate; and
logic coupled to the substrate, wherein the logic is implemented at least partly in one or more of configurable logic or fixed-functionality hardware logic, the logic coupled to the substrate working in conjunction with the system manager to:
associate, using a key for a customer, a key domain of a plurality of key domains with a virtual machine image associated with the guest virtual machine, the key being unknown to a virtual machine manager associated with the guest virtual machine;
receive the virtual machine image from a customer;
partition, in conjunction with the system manager, the virtual machine image as a sequence of protocol data units (PDUs);
load content of each PDU of the sequence of PDUs consecutively into a sequential page in a memory, wherein each page is loaded into a page table of the guest virtual machine and the logic keeps track of loading using a global transaction count for the key domain and a location in memory of the page; and
verify an integrity of the virtual machine image that is to be installed in the key domain by checking, using the key, a value calculated using the page location, content, and the global transaction count of each of the loaded PDUs.

9. The semiconductor package apparatus according to claim 8, wherein the page table is to include one or more mappings of virtual addresses to physical addresses of the memory.

10. The semiconductor package apparatus according to claim 8, wherein the semiconductor package apparatus is to be provided in a cloud-based server.

11. The semiconductor package apparatus according to claim 8, wherein the key domain is to be associated with the virtual machine image based on the customer key received from the customer.

12. The semiconductor package apparatus according to claim 8, wherein, to associate the key domain with the virtual machine image, the logic coupled to the substrate is to create a new key domain to store the virtual machine image.

13. The semiconductor package apparatus according to claim 8, wherein, to associate the key domain with the virtual machine image, the logic coupled to the substrate is to select the key domain among the plurality of key domains to store the virtual machine image.

14. An article comprising a non-transitory machine-readable medium having stored thereon instructions that, when executed by a machine, cause a logic of the machine in conjunction with a system agent, to execute on the machine, wherein the system agent manages actions of an associated guest virtual machine that is to be provisioned and the logic is implemented at least partly in one or more of configurable logic or fixed-functionality hardware logic of the machine, to:
associate, using a key for a customer, a key domain of a plurality of key domains with a virtual machine image associated with the guest virtual machine, the key being unknown to a virtual machine manager associated with the guest virtual machine;
receive the virtual machine image from a customer;
partition, by at least the system agent, the virtual machine image as a sequence of protocol data units (PDUs);
load content of each PDU of the sequence of PDUs consecutively into a sequential page of a memory, wherein each page is loaded into a page table of the guest virtual machine and the logic keeps track of loading using a global transaction count for the key domain and a location in memory of the page; and verify an integrity of the customer image that is to be installed in the key domain by checking, using the key, a value calculated using the page location, content, and the global transaction count of each of the loaded PDUs.

15. The article according to claim 14, wherein the page table is to include one or more mappings of virtual addresses to physical addresses of the memory.

16. The article according to claim 14, wherein the article is to be provided in a cloud-based server.

17. The article according to claim 14, wherein the key domain is to be associated with the virtual machine image based on the customer key received from the customer.

18. The article according to claim 14, wherein to associate the key domain with the virtual machine image, the instructions, when executed by a machine, cause the machine to create a new key domain to store the virtual machine image.

19. The article according to claim 14, wherein, to associate the key domain with the virtual machine image, the instructions, when executed by a machine, cause the machine to select the key domain among the plurality of key domains to store the virtual machine image.

20. The article according to claim 15, wherein after a leaf page of the page table is completely filled with consecutive protocol data units (PDUs), the machine moves to a previous PDU level.

\* \* \* \* \*